T. WOODARD.
CONVERTIBLE ROTARY HARROW.

No. 174,337. Patented Feb. 29, 1876.

Witnesses.
Otto Hufeland.
Chas. Wahlers.

Inventor.
Theodore Woodard
pr
Van Santvoord & Hauff
Attys

UNITED STATES PATENT OFFICE.

THEODORE WOODARD, OF MEMPHIS, KANSAS, ASSIGNOR TO HIMSELF AND JAMES M. PALMER, OF SAME PLACE.

IMPROVEMENT IN CONVERTIBLE ROTARY HARROWS.

Specification forming part of Letters Patent No. 174,337, dated February 29, 1876; application filed September 23, 1875.

*To all whom it may concern:*

Be it known that I, THEODORE WOODARD, of Memphis, in the county of Bourbon and State of Kansas, have invented a new and useful Improvement in Convertible Harrow and Cart, which improvement is fully set forth in the following specification, reference being had to the accompanying drawing, in which—

Figure 1:
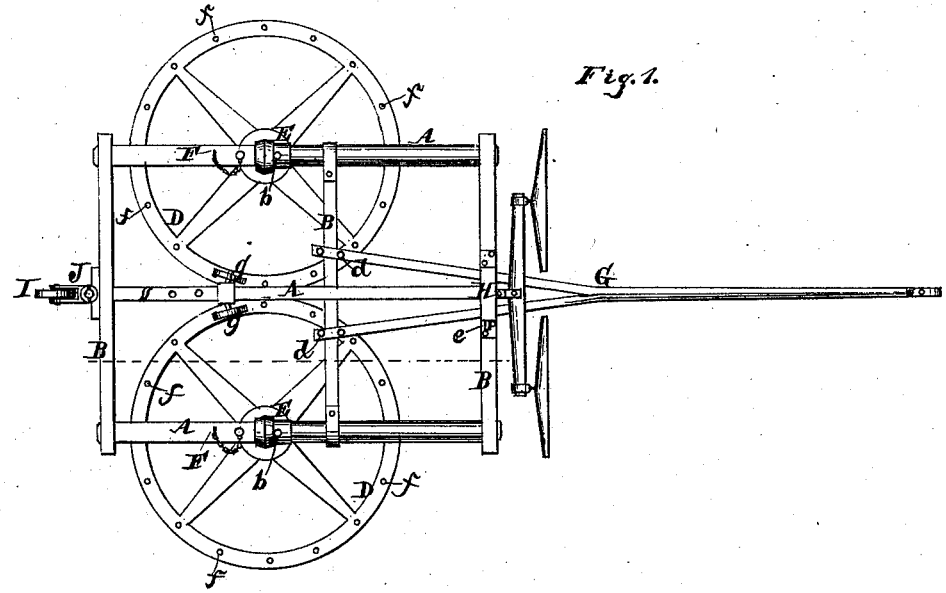
Figure 2:
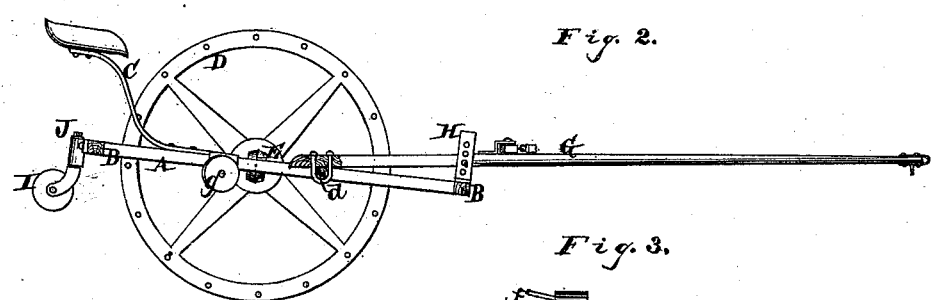
Figure 3:
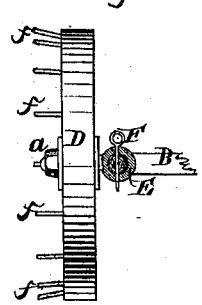

Figure 1 represents a plan view of my improvement in the form of a harrow. Fig. 2 is a longitudinal section thereof converted into a cart. Fig. 3 shows one of the wheels, and its mode of connection to the harrow-frame.

Similar letters indicate corresponding parts.

This invention relates to that class of harrows which are constructed to be converted into carts; and my invention consists of a peculiar construction and combination of parts, which will be fully hereinafter described, and the improvements specifically pointed out in the claim.

In the drawing, the letter A designates longitudinal bars and B cross-pieces, composing the frame of my harrow, to a suitable part of which is secured a driver's seat, C. D D are the harrow-wheels; and E E, eyebolts, the shanks of which form the center and the axes of these wheels, and which are fastened to the wheels by means of nuts *a*. The eyes or ring portions of the eyebolts E E embrace loosely the side longitudinal bars A of the harrow-frame, and by this arrangement the wheels D D are adapted to be adjusted to a horizontal or a vertical position, in order to form a harrow or a cart. The wheels are held in their respective positions by means of clamps, which in the present example have the form of pins F, which are passed through holes *b* formed in the eyebolts and the side bars A, as shown in Fig. 3; but the clamp may have any other form, and among others that of a set-screw.

The letter G designates the adjustable draft pole or bar of my harrow. The rear end of this pole is forked, and it is connected to one of the cross-pieces B, by means of clips *d*, in such a way that the pole is capable of swinging vertically. The pole is guided in a yoke, H, which is provided with holes containing a pin, *e*, by which the pole may be held in any desirable position. This pin *e* also may be substituted by a set-screw. By making the draft-pole G adjustable it may be raised or lowered to accommodate horses of different stature, so that the harrow-wheels D D are not liable to be lifted from the ground by the draft of the animal. The harrow-frame carries a roller, I, which is swiveled by means of a bracket, J, similar to a furniture-caster, and attached to the rear cross-piece B of the frame, so as to bear on the ground. By arranging this roller H on the harrow-frame, the weight of the driver occupying the seat C is equally distributed, while the harrow-wheels D D preserve a level position, and are caused to rotate uniformly. By this roller I, moreover, the harrow is better adapted to preserve a straight course, while its steering is facilitated. With the rotary wheels are combined anti-friction rollers *g*, which have their bearings in the middle longitudinal bar A of the harrow-frame, so as to bear on the surface of the wheels and assist in keeping them level.

The harrow-wheels D D have teeth *f*, which I arrange obliquely to the surface of said wheels, say at an angle of about thirty degrees, and by this arrangement of the teeth the wheels D D are caused to rotate freely when drawn over the ground.

I also intend to combine with my harrow a latch for pressing on that part of the wheels outside of the side bars A, to assist in keeping the wheels level, the said latch being arranged to fold up when the wheels are elevated to form a cart.

I am aware that a harrow has been constructed so as to be converted from a truck to a harrow, and vice versa; but in such the journal-heads carrying the harrow-wheels have not been constructed to surround the side bars as in my invention, in which the eyes forming the journals of the wheels are slipped on from the ends of the side bars, thereby facilitating the construction and reducing the cost of the machine.

What I claim as new, and desire to secure by Letters Patent, is—

In combination with the side bars A and cross-bars B, the wheels D, having the eyes E E fitted upon and loosely embracing the side bars, and a device passing through the eyes and side bars for securing the eyes in their adjustable positions, as and for the object specified.

In testimony that I claim the foregoing I have hereunto set my hand and seal this 3d day of September, 1875.

THEODORE WOODARD. [L. S.]

Witnesses:
NAT. G. BURTEN,
F. DANFORD.